United States Patent
Szabelski (10) Patent No.: US 7,185,126 B2
(45) Date of Patent: *Feb. 27, 2007

(54) UNIVERSAL SERIAL BUS HUB WITH SHARED TRANSACTION TRANSLATOR MEMORY

(75) Inventor: Piotr Szabelski, Santa Clara, CA (US)

(73) Assignee: Standard Microsystems Corporation, Hauppauge, NY (US)

(*) Notice: Subject to any disclaimer, the term of this patent is extended or adjusted under 35 U.S.C. 154(b) by 177 days.

This patent is subject to a terminal disclaimer.

(21) Appl. No.: 10/374,162

(22) Filed: Feb. 24, 2003

(65) Prior Publication Data

US 2004/0168001 A1    Aug. 26, 2004

(51) Int. Cl.
*G06F 13/00* (2006.01)
*G06F 13/20* (2006.01)
*G06F 13/38* (2006.01)
*G06F 13/42* (2006.01)
*G06F 3/00* (2006.01)

(52) U.S. Cl. .............. 710/60; 710/2; 710/8; 710/20; 710/36; 710/62; 710/63; 710/64; 710/72; 710/73; 710/74; 710/104; 710/105; 710/313; 711/129; 711/130; 711/147; 711/153

(58) Field of Classification Search ............ 710/1, 710/2, 5–8, 15–18, 20, 21, 29, 31, 33, 36, 710/38, 52, 58, 60–64, 72–74, 104, 105, 710/302, 313; 711/100, 129, 130, 147, 150, 711/153
See application file for complete search history.

(56) References Cited

U.S. PATENT DOCUMENTS

| | | | |
|---|---|---|---|
| 5,815,167 A | 9/1998 | Muthal et al. | |
| 5,890,015 A | 3/1999 | Garney et al. | |
| 5,953,511 A | 9/1999 | Sescila, III et al. | |
| 6,119,196 A * | 9/2000 | Muller et al. | 710/243 |
| 6,141,719 A | 10/2000 | Rafferty et al. | |

(Continued)

FOREIGN PATENT DOCUMENTS

EP    0 982 663 A2    3/2000

(Continued)

OTHER PUBLICATIONS

Cypress Semiconductor Corporation, "TetraHub™ High-speed USB Hub Controller," Publication No. CY7C6540, Dec. 5, 2002, 25 pages.

(Continued)

*Primary Examiner*—Tanh Q. Nguyen
(74) *Attorney, Agent, or Firm*—Meyertons Hood Kivlin Kowert & Goetzel, P.C.; Jeffrey C. Hood (57) ABSTRACT

Various embodiments of a method and apparatus for implementing multiple transaction translators that share a single memory in a serial hub are disclosed. For example, in one embodiment, a USB (Universal Serial Bus) hub may include a shared memory device, at least one faster data handler coupled to transfer data between the shared memory device and a faster port, and several slower handlers each coupled to transfer data between the shared memory device and a respective one of several slower ports.

22 Claims, 4 Drawing Sheets

U.S. PATENT DOCUMENTS

| | | | |
|---|---|---|---|
| 6,145,045 A | 11/2000 | Falik et al. | |
| 6,185,641 B1 | 2/2001 | Dunnihoo | |
| 6,205,501 B1 | 3/2001 | Brief et al. | |
| 6,279,060 B1 | 8/2001 | Luke et al. | |
| 6,304,995 B1 | 10/2001 | Smith et al. | |
| 6,308,239 B1 | 10/2001 | Osakada et al. | |
| 6,324,605 B1 | 11/2001 | Rafferty et al. | |
| 6,435,904 B1 | 8/2002 | Herbst et al. | |
| 6,480,927 B1 | 11/2002 | Bauman | |
| 6,505,267 B2 | 1/2003 | Luke et al. | |
| 6,532,512 B1 | 3/2003 | Torii et al. | |
| 6,564,275 B1 | 5/2003 | Chen | |
| 6,601,146 B2 * | 7/2003 | Auslander et al. | 711/147 |
| 6,671,765 B1 | 12/2003 | Karlson et al. | |
| 6,678,760 B2 | 1/2004 | Brief | |
| 6,725,302 B1 | 4/2004 | Benayoun et al. | |
| 6,732,218 B2 | 5/2004 | Overtoom et al. | |
| 6,775,733 B2 | 8/2004 | Chang et al. | |
| 6,816,929 B2 | 11/2004 | Ueda | |
| 6,959,355 B2 | 10/2005 | Szabelski | |
| 6,993,620 B2 | 1/2006 | Ferguson | |
| 7,024,501 B1 | 4/2006 | Wright | |
| 7,028,114 B1 | 4/2006 | Milan et al. | |
| 7,028,133 B1 | 4/2006 | Jackson | |
| 2002/0154625 A1 * | 10/2002 | Ma | 370/351 |
| 2004/0019732 A1 | 1/2004 | Overtoom et al. | |
| 2004/0153597 A1 | 8/2004 | Kanai et al. | |
| 2004/0168009 A1 | 8/2004 | Szabelski | |
| 2004/0225808 A1 | 11/2004 | Grovindaraman | |
| 2006/0020737 A1 | 1/2006 | Szabelski | |
| 2006/0056401 A1 | 3/2006 | Bohm et al. | |
| 2006/0059293 A1 | 3/2006 | Wurzberg et al. | |

FOREIGN PATENT DOCUMENTS

| | | |
|---|---|---|
| GB | 2 352 540 A | 1/2001 |
| JP | 2000-242377 | 9/2000 |
| JP | 2001-043178 | 2/2001 |
| KR | 10-2004-0008365 A | 1/2004 |
| KR | 10-0490068 B1 | 5/2005 |

OTHER PUBLICATIONS

Compaq et al.; *Universal Serial Bus Specification*, Revision 2.0; Chapter 11: Hub Specification, Apr. 27, 2000, pp. 297-437 (Revision 2.0).

"On-The-Go Supplement to the USB 2.0 Specification—Revision 1.0"; Dec. 18, 2001.

"Programmable Multi-Hose Device Sharing USB Hub"; Research Disclosure, IBM Corp.; Feb. 1, 1999; Mason Publications; Hampshire, GB.

* cited by examiner

UNIVERSAL SERIAL BUS HUB WITH SHARED TRANSACTION TRANSLATOR MEMORY

BACKGROUND OF THE INVENTION

1. Field of the Invention

This invention relates to computer systems, and more particularly, to universal serial bus hubs used in computer systems.

2. Description of the Related Art

Components in computer systems communicate over various buses. One popular type of bus is the Universal Serial Bus (USB). The USB is a cable bus that allows a host computer to exchange data with a range of peripheral devices. USB peripherals share USB bandwidth through a host-scheduled, token-based protocol. A USB allows peripherals to be attached, configured, used, and detached while the host and other peripherals are in operation.

USB hubs allow multiple peripherals to be attached at a single host attachment point. Thus, a hub converts a single host attachment point into multiple peripheral attachment points. Each attachment point is referred to as a port. A hub typically includes an upstream port, which couples the hub to the host, and several downstream ports, which each couple the hub to another hub or peripheral. Each downstream port may be individually enabled and attached to a high-, full-, or low-speed device.

A USB hub typically includes a hub controller, a hub repeater, and a transaction translator. The hub repeater provides a USB protocol-controlled switch between the upstream port and downstream ports as well as support for reset and suspend/resume signaling. The host controller facilitates communication to and from the host. The transaction translator allows full- and/or low-speed downstream devices to communicate with a high-speed host. Typically, the number of transaction translators included in a USB hub limits the number of simultaneous transfers that can take place to full- and/or low-speed downstream devices used in a system with a high-speed host.

SUMMARY

Various embodiments of a method and apparatus for implementing multiple transaction translators that share a single memory in a USB (Universal Serial Bus) hub are disclosed. For example, in one embodiment, a USB hub may include a shared memory device, at least one faster data handler coupled to transfer data between the shared memory device and a faster port, and several slower handlers each coupled to transfer data between the shared memory device and a respective one of several slower ports.

In one embodiment, a USB hub may include a shared memory device, at least one faster handler coupled to transfer data between the shared memory device and a faster port, several slower handlers each coupled to transfer data between the shared memory device and a respective one of several slower ports, and a memory arbiter. The slower ports each have a lower data transfer rate than the faster port. The memory arbiter may be configured to arbitrate between requests to access the shared memory device generated by the faster handler and the slower handlers.

In some embodiments, the faster handler may include at least two buffers. The faster handler may be configured to transfer data between the faster port and one of the buffers while also transferring data between the shared memory device and a different one of the buffers. The capacity of each of the buffers may be equal to or greater than an amount of data accessible in the shared memory device in response to a single request initiated by the faster handler.

The memory arbiter may be configured to allow the faster handler to access the shared memory device more frequently than any of the slower handlers access the shared memory device. In one embodiment, the memory arbiter may allow the faster handler to access the shared memory device at least every other arbitration cycle in the memory arbiter. In such an embodiment, if there are N slower handlers, the memory arbiter may allow each of the slower handlers to access the shared memory device at least every 2N arbitration cycles in the memory arbiter. The memory arbiter may arbitrate between the slower handlers on a round-robin basis.

The memory arbiter may map data written by the faster handler into a region of the shared memory device corresponding to one of the plurality of slower handlers to which the data is being transferred. The memory arbiter may map data written by one of the slower handlers into a region of the shared memory device corresponding to that one of the slower handlers. The faster and slower handlers may be configured to transfer data according to a USB (Universal Serial Bus) protocol in some embodiments.

In one embodiment, a method may involve: a port of a USB hub receiving a data stream for transfer to another port having a different transfer rate; a handler associated with the port storing data included in the data stream in the shared memory device in response to winning arbitration for access to the shared memory device; a handler associated with the other port retrieving the data from the shared memory device in response to winning arbitration for access to the shared memory device; and the other port outputting a data stream including the data at the different transfer rate.

In another embodiment, a method may involve: several ports in a USB hub each receiving a respective data stream, where at least one of the ports receives its respective data stream at a different rate than the other ports; arbitrating between several handlers, which are each associated with a respective one of the ports, for access to a shared memory device; and one of the handlers storing to the shared memory device data included in the respective data stream received by the respective one of the ports in response to being selected by said arbitrating.

In yet another embodiment, a method may involve: a USB hub receiving data for transfer via a plurality of downstream ports; each of a plurality of downstream data handlers accessing a portion of the data in a shared memory device; and each of the plurality of downstream data handlers outputting the portion of the data from a respective one of the plurality of downstream ports.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

A USB (Universal Serial Bus) hub may include several ports. Such a hub may include multiple data handling devices that are each associated with a particular port and that are used when transferring data between ports operating at different rates. When data is being transferred between ports operating at the same rate, the data handling devices may be inactive. The data handling devices may share a single memory device instead of each including a separate memory device. The data handling devices may arbitrate for access to the shared memory device in order to transfer data between the shared memory device and the port with which that data handling device is associated. A relatively small amount (compared to the amount of storage provided by the shared memory device) of buffer space may be provided within each data handling device in order to allow the data handling device to temporarily buffer data (e.g., while waiting to gain access to the shared memory device).

A USB hub that includes a shared memory device for use when transferring data between ports having different rates may be used to couple various devices within a computer system. For example, a hub may couple a host to one or more devices such as: human interface devices such as mice, keyboards, tablets, digital pens, and game controllers; imaging devices such as printers, scanners, and cameras; mass storage devices such as CD-ROM drives, floppy disk drives, and DVD drives; and other hubs. An exemplary USB hub that implements a USB protocol is described with respect to FIGS. 1–6 herein.

Figure 1:
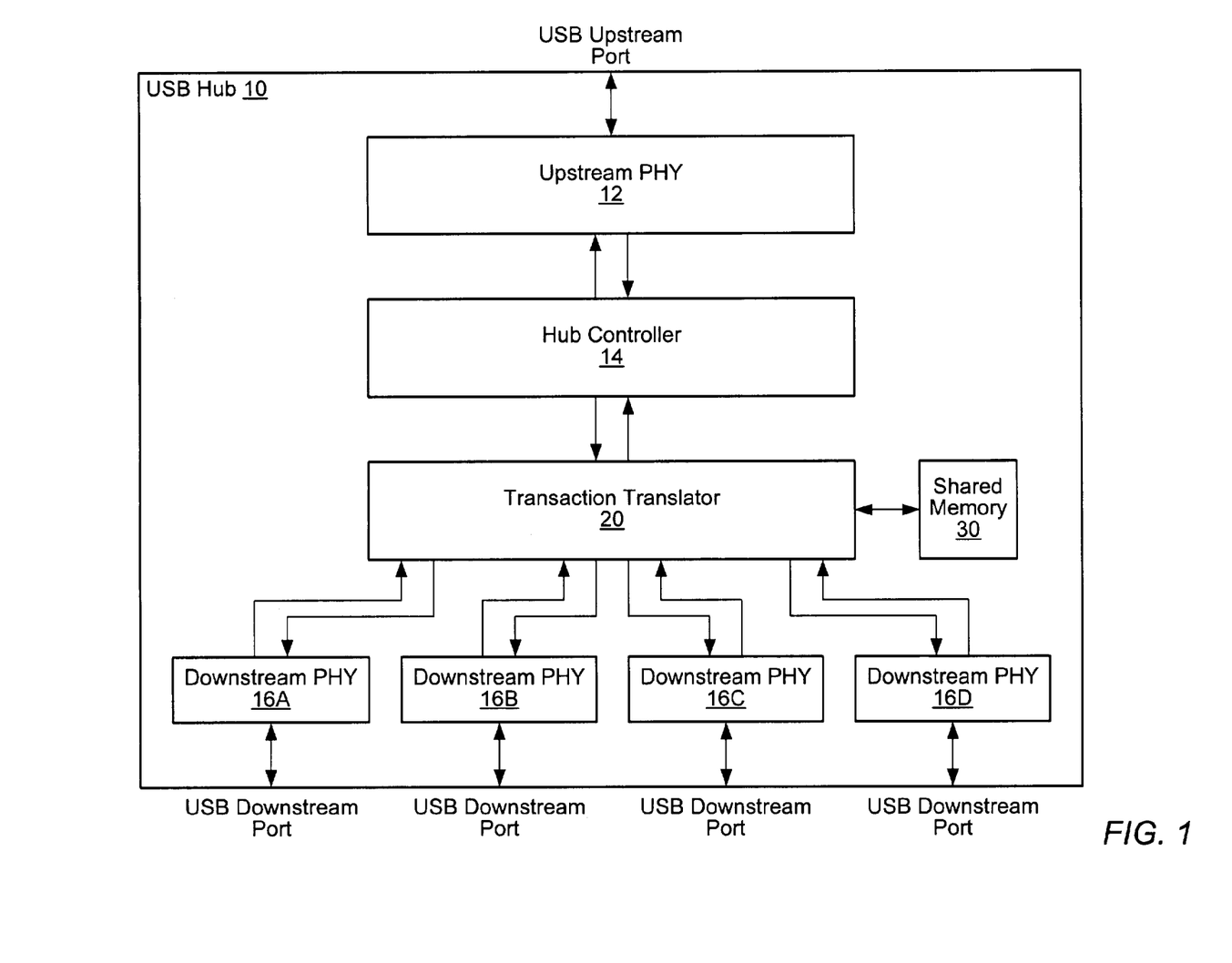
FIG. 1 shows a block diagram of a USB hub, according to one embodiment.

FIG. 1 shows a block diagram of a USB hub 10, according to one embodiment. As shown, the USB hub 10 includes an upstream port and four downstream ports. Note that the number of ports may vary among embodiments. Each port is coupled to a physical layer device (PHY). Upstream PHY 12 couples the upstream port to the hub controller 14. Downstream PHYs 16A–16D (collectively, PHYs 16) couple a respective downstream port to transaction translators 20. Hub controller 14 receives a high-speed data stream from upstream PHY 12 and provides the data to transaction translator 20 for transmission to one of the downstream PHYs 16. USB hub 10 may also handle transfers from downstream PHYs 16 to upstream PHY 12 by having transaction translator 20 transform a low- or full-speed data stream received via a downstream PHY 16 into a high-speed data stream for transmission via upstream PHY 12. Each port is an example of a means for receiving a serial data stream.

Note that the illustrated embodiment shows portions of a hub 10 configuration needed to allow a high-speed upstream device to communicate with one or more full- and/or low-speed downstream devices through the use of transaction translators 20. Hub 10 may also support communication between high-speed upstream devices and high-speed downstream devices and/or between full- and/or low-speed upstream devices and full- and/or low-speed downstream devices (e.g., via direct connection of the upstream PHY and downstream PHYs). The transaction translators 20 may be inactive if the upstream and downstream devices are communicating the same speed data streams.

The number of transaction translators 20 may determine how many of the downstream PHYs 16 are able to transfer data at substantially the same time. For example, if there are four translation translators 20, each PHY 16 may be able to transfer data at substantially the same time as the other PHYs 16 are transferring data.

In the illustrated embodiment, transaction translators 20 share access to shared memory device 30. Each transaction translator 20 may temporarily store data in a portion of shared memory device 30 while translating data streams between high-speed and full- or low-speed. Shared memory device 30 may be an SRAM (Synchronous Random Access Memory) device in some embodiments.

Figure 2:
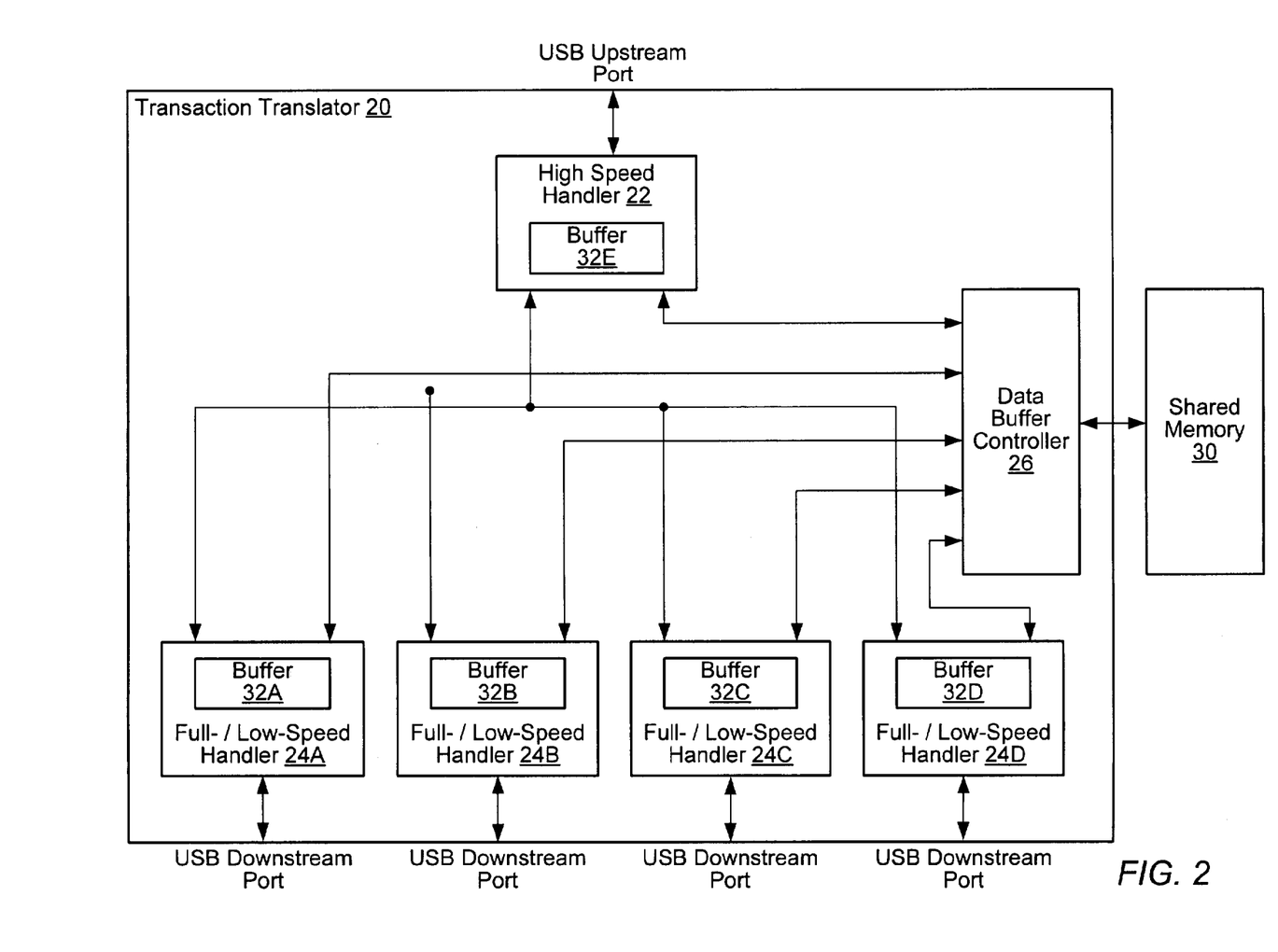
FIG. 2 is a block diagram of a set of transaction translators that share a single memory device, according to one embodiment.

FIG. 2 illustrates a block diagram of a set of transaction translators, according to one embodiment. In FIG. 2, a single high-speed handler 22 is shared between the transaction translators 20. The high-speed handler 22 is configured to send and receive a high-speed data stream via the upstream port. Note that in some embodiments, a separate high-speed handler 22 may be implemented for each transaction translator (e.g., if multiple upstream ports are implemented).

Each handler 22 and 24 is configured to send requests to access shared memory device 30 to data buffer controller 26. In the illustrated embodiment, shared memory device 30 is a single-ported memory device, and thus the high- and full- and/or low-speed handlers arbitrate for access to the shared memory device. Data buffer controller 26 is configured to arbitrate between the handlers' requests to determine which handler's request to provide to the shared memory device 30. Data buffer controller 26 may additionally perform address remapping on at least some of the handlers' requests in some embodiments. Note that in other embodiments, the shared memory device 30 may have more than one port, thus allowing more than one data handler to access the shared memory device at substantially the same time.

Each handler 22 and 24 includes buffers 32 to store data being transferred to or from shared memory device 30 prior to transmitting that data to another handler or subsequent to receiving that data from one of the hub's ports. For example, high-speed handler 22 is configured to receive a high-speed stream of data via the upstream port. Portions of the received data may be temporarily buffered in buffer 32E while high-speed handler 22 arbitrates for access to shared memory 30. When access is granted, high-speed handler 22 transfers the buffered data to shared memory 30. In many embodiments, buffer 32E may include two independently accessible buffers so that incoming data can be stored in one buffer while data is written to shared memory device from the other buffer area. High-speed handler 22 may also transmit information to the full- and/or low-speed handler 24 that the data stream is being transmitted to indicating the location of the data to be handled by that full- and/or low-speed handler. Alternatively, different portions of the shared memory 30 may be allocated to each full- and/or low-speed handler 24, allowing the high-speed handler 22 to indicate which handler 24 is the recipient of the data stream by writing the data into the portion of the shared memory 30 allocated to that handler.

When a data stream received by one of the full- and/or low-speed handlers 24 is being output by high-speed handler 22, the receiving full- and/or low-speed handler 24 may transmit information to the high-speed handler 22 indicating the location of the data in shared memory device 30. High-speed handler 22 may then arbitrate for access to shared memory device 30 and store a portion of the data in buffer 32E for transfer at the high-speed rate to the upstream port. As when high-speed handler 22 is receiving a high-speed data stream, the buffer 32E may include two independently accessible buffer areas so that data can be transferred to the upstream port from one buffer area while the other buffer area is being loaded with more data from shared memory device 30. Note that in other embodiments, buffer 32E may be a dual-ported device so that data can be transferred into and/or out of the buffer for transfers via the upstream port at substantially the same time as data is also being transferred to and/or from shared memory device 30. As mentioned previously, there may be more than two independently accessible buffers in buffer 32E. The size of each buffer in buffer 32E may be the same as (or greater than) the amount of data accessible in shared memory device 30 by a single access request in some embodiments. In some embodiments, the size of the buffers 32E in the high-speed handler 22 may be larger than the size of buffers 32A–32D in the full- and/or low speed handlers 24.

Full- and/or low-speed handlers 24A–24D may each use their respective buffers 32A–32D in much the same way as high speed handler 22 when sending and receiving data via a respective downstream port.

Figure 3:
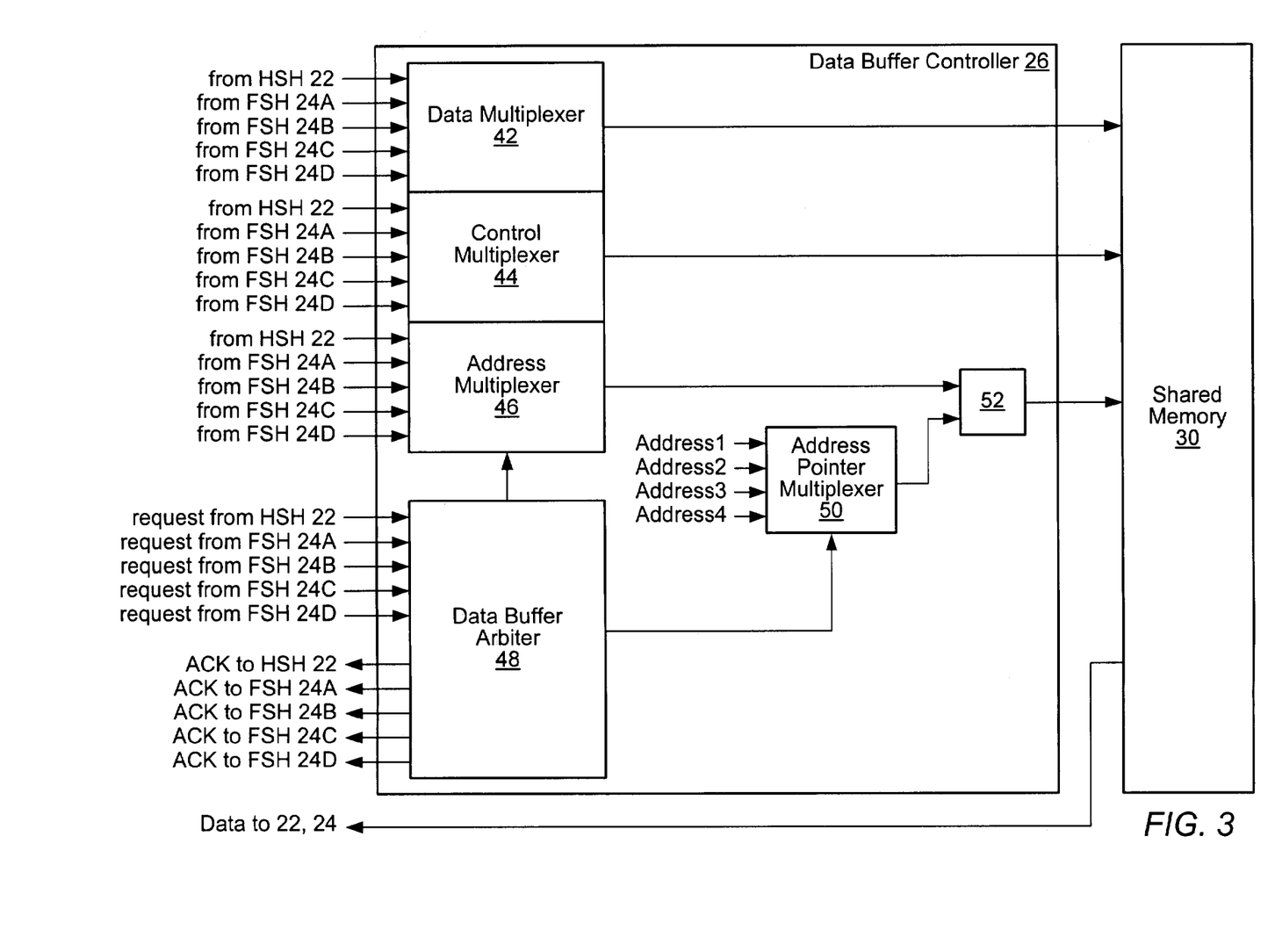
FIG. 3 shows a block diagram of a data buffer controller, according to one embodiment.

FIG. 3 illustrates a data buffer controller 26 according to one embodiment. In this embodiment, data buffer controller includes a data multiplexer 42, a control multiplexer 44, an address multiplexer 46, a data buffer arbiter 48, an address pointer multiplexer 50, and an address combiner 52. Data signals from each high-speed handler (HSH) 22 and full- and/or low-speed handler (FSH) 24 are provided to data multiplexer 42. Similarly, control signals and address signals from each handler 22 and 24 are respectively provided to control multiplexer 44 and address multiplexer 46. Data buffer arbiter 48 receives requests to access shared memory device 30 from each handler and selects one of the handlers each arbitration cycle. The selected handler in a particular arbitration cycle is considered to have won the arbitration in that cycle. Non-selected handlers may continue asserting their requests into the next arbitration cycle. The data buffer arbiter 48 may send an acknowledgement (ACK) to the winning handler each arbitration cycle. As shown, a different signal line may be used to send ACKs to each different handler in some embodiments.

In response to receiving an acknowledgement from the data buffer controller 26, a handler may assert address, data, and control signals (note that these signals may be asserted at the same time as the corresponding request is asserted). The data buffer arbiter 48 may control data multiplexer 42, control multiplexer 44, and address multiplexer 46 so that the selected handler's address, data, and control signals are provided to shared memory 30. When the handler's requested memory access is complete, the data buffer arbiter 48 may select another handler's request as part of the next arbitration cycle.

Generally, arbitration cycles correspond to cycles in which the shared memory device can be accessed (i.e., one handler may win arbitration and access memory each cycle in which the memory is accessible). The rate at which the memory can be accessed may be significantly higher than the rates at which either the high-speed handler 22 or the full- and/or low speed handlers 24 request access to the shared memory device 30. For example, in one embodiment, the shared memory device 30 may be configured to output up to four bytes of data every 60 MHz cycle period. In this embodiment, the high-speed handler 22 may be configured to transfer up to one byte every 60 MHz clock cycle and have enough space in buffer 32E to store four bytes of data. When operating at full-speed, handlers 24A–24D may each be configured to transfer up to one byte every $40^{th}$ clock cycle of a 60 MHz clock and have enough space in buffers 32A–32D to store four bytes of data. In an embodiment like this, the data buffer arbiter 48 may be configured to allow each handler to win arbitration frequently enough to operate at that handler's maximum bandwidth. Thus, the high-speed handler 22 may be allowed to win arbitration at least every fourth 60 MHz clock cycle and each full-speed handler may be allowed to win arbitration at least every $160^{th}$ 60 MHz clock cycle. Note that the 60 MHz clock frequency is merely exemplary and that other embodiments may have significantly different timing parameters. Similarly, the timing parameters may vary depending on the size of the buffers 32 provided in each handler (e.g., as buffer 32 size is increased, a handler may need to access the shared memory 30 less frequently).

If more than one of the full- and/or low-speed handlers 24 is requesting access to shared memory device 30 in the same arbitration cycle, the data buffer arbiter 48 may arbitrate between the full- and/or low-speed handlers 24 on a round-robin basis. If the high-speed handler 22 is requesting data in the same arbitration cycle as any of the full- and/or low-speed handlers 24, the data buffer arbiter 48 may give the high-speed handler 22 priority in the arbitration. If only one handler 22 or 24 is requesting access to the shared memory device 30 in a particular arbitration cycle, the requesting handler will win arbitration. In embodiments with more than one high-speed handler 22, data buffer arbiter 48 may arbitrate between high-speed handlers 22 on a round robin basis and give all of the high-speed handlers priority over full- and/or low-speed handlers 24. In order to prevent the full- and/or low-speed handlers 24 from being starved, however, the data buffer arbiter 48 may allow the full- and/or low-speed handlers to win arbitration at some minimum guaranteed frequency (e.g., every $160^{th}$ clock cycle for the timing example above). Assuming the number of each type of handler 22 and 24 shown in FIG. 2, the data buffer arbiter 48 may, for example, prioritize accesses in the following order when all handlers request access during the same arbitration cycles: HSH 22, FSH 24A, HSH 22, FSH 24B, HSH 22, FSH 24C, HSH 22, FSH 24D, HSH 22, FSH 24A, and so on.

The data buffer controller 26 may perform address mapping on the addresses received from at least some of the handlers. In this embodiment, the data buffer controller 26 selects one of four address pointers, Address1–Address4, to combine with the address selected by address multiplexer 46. The address pointers Address1–Address4 may specify different regions within the shared memory device by specifying different base addresses, and the address signals provided by each handler may be used to specify an offset within one of those different regions. The combined address is then provided to shared memory device 30. In one embodiment, the selection of the address pointer may be performed by controlling address pointer multiplexer dependent on which of the full- and/or low-speed handlers 24 is involved in transferring the data. For example, if the high-speed handler 22 wins the arbitration and is writing data received via upstream port destined for the downstream port coupled to full- and/or low-speed handler 24B, the data buffer arbiter 48 may assert a control signal indicating that address pointer multiplexer 50 should select the address pointer (e.g., Address2) associated with full- and/or low-speed handler 24B. Similarly, if data is received by the downstream port associated with full- and/or low-speed handler 24D for transfer to the upstream data port, the data buffer arbiter 48 may assert a control signal indicating that address pointer multiplexer 50 should select the address pointer (e.g., Address4) associated with full- and/or low-speed handler 24D.

Figure 4:
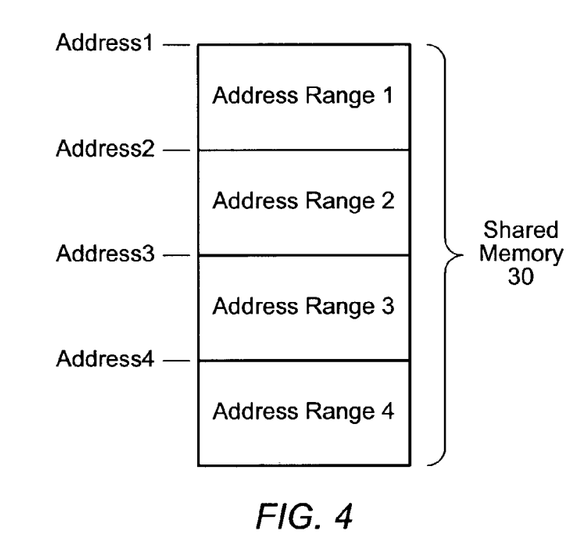
FIG. 4 illustrates a memory mapping that may be used to share a memory device between multiple transaction translators, according to one embodiment.

FIG. 4 illustrates an exemplary address mapping within the shared memory device 30 that may be implemented by data buffer controller 26. In this embodiment, the shared memory device is subdivided into four regions, one for each full- and/or low-speed handler. The base of each region is identified by one of the address pointers Address1–Address4 shown in FIG. 3. Note that in some embodiments, the address pointers may be static, and the size of each region (which in turn determines the offset between address pointers) may be selected to handle storage needs in the situation in which each full- and/or low-speed handler 24 is transferring a data stream at the same time. In other embodiments, the address pointers may be dynamic (although the times at which address pointers may be updated may be limited) and regions may be resized in response to current usage. Note that other embodiments may perform different types of address mapping or no address mapping at all.

Figure 5:
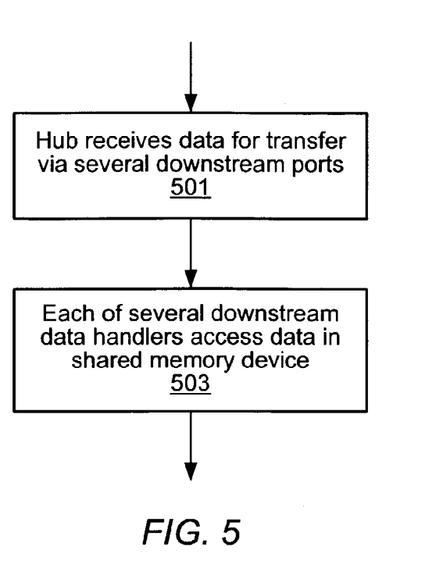
FIG. 5 is a flowchart of one embodiment of a method of operating a USB hub that includes multiple transaction translators that share memory.

FIG. 5 is a flowchart of one embodiment of a method of operating a serial bus hub that uses a shared memory device for transfers involving more than one downstream data handler. Such a hub may be used to transfer data between connections that are operating at different rates. At 501, a hub receives data for transfer via several downstream ports. For example, an upstream port of the hub may receive data for several different data transfers, each involving a different downstream port. Alternatively, each of the different downstream ports may receive data being transferred upstream. In order to implement the appropriate transfers, each of the downstream data handlers accesses data in a shared memory device. For example, if the data is being transferred downstream, each downstream data handler may retrieve an appropriate portion of the data from the shared memory device and output that data at the appropriate rate via a respective downstream port. Since the memory device is shared between more than one downstream data handler, arbitration may be performed to select which of the various data handlers may access the shared memory each cycle. If the data is being transferred upstream, each downstream data handler may receive a portion of the data from a respective downstream port and store the data to the shared memory device. One or more upstream data handlers may then retrieve the data for each transfer from the shared memory device to output via the upstream port.

USB Protocol

In many embodiments, a serial hub may be configured to implement the USB protocol, which defines a polled bus on which a host may initiate data transfers. Typical USB transactions involve several packets. The host initiates a transaction by sending a packet indicating the type and direction (upstream or downstream) of the transaction being initiated, the address of the target device, and an endpoint. If a downstream transfer is requested, the target device receives data transferred from the host. Similarly, if an upstream transfer is requested, the target device sends data to the host. A handshake packet may then be sent to the host from the target device to indicate whether the transfer was successful. The USB protocol describes the transfer between a source or destination on the host and an endpoint on a device as a pipe. Pipes may be either stream pipes or message pipes. Data transferred via a stream pipe has no USB-defined structure, unlike data transferred via a message pipe. Different pipes may have different bandwidths, speeds, and endpoint characteristics (e.g., sink or source, buffer size, etc.) and be used to transfer packets of different sizes.

Figure 6:
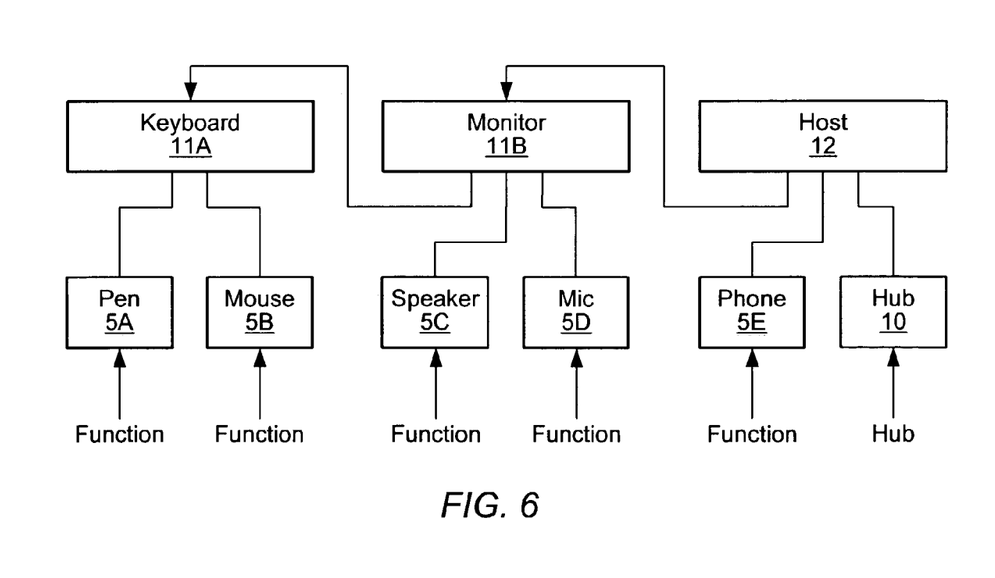
FIG. 6 is a block diagram of a system that includes one or more USB hubs.

FIG. 6 illustrates an exemplary computer system that may include one or more USB hubs 10 as described above. In the embodiment illustrated in FIG. 6, a hub included within host 12 couples directly to hub 10, phone 5E, and monitor 11B. Monitor 11B includes another hub, which couples directly to microphone 5D, speaker 5C and keyboard 11A. Keyboard 11A includes yet another hub, which couples directly to mouse 5B and pen 5A.

Any and/or all of the hubs shown in FIG. 6 may be implemented similarly to those described above. Typically, some of the hubs will connect functions operating at the same rate while other hubs will connect functions operating at different rates. Whenever a high-speed function communicates with a non-high-speed function via a hub, transaction translators included in the hub may be used to convert data streams between the different rates. Such transaction translators may share a memory device, as described above. Note that non-USB embodiments of a serial hub may be included in similar computer systems.

As shown in FIG. 6, several devices in a computer system may be coupled to a host by various USB connection. A device that is configured to transmit and/or receive data and/or control information over a USB connection may be referred to as a function. Functions are typically implemented as separate peripheral devices that connect to a USB connection, which in turn plugs into a port on a hub. In FIG. 6, exemplary functions include pen 5A, mouse. 5B, speaker 5C, microphone 5D, and phone 5E. Some devices, referred to as compound devices, may be implemented in a single physical package that includes one or more functions and/or a hub. Exemplary compound devices in FIG. 6 include keyboard 11A and monitor 11B. All of these functions are coupled to host 12, which may also include a hub that allows the various functions to communicate with the host processor. An additional hub 10 may be coupled to the host in order to provide additional connectivity for other devices (e.g., cameras, printers, scanners, etc.).

Numerous variations and modifications will become apparent to those skilled in the art once the above disclosure is fully appreciated. It is intended that the following claims be interpreted to embrace all such variations and modifications.

What is claimed is:

1. A system, comprising:
   a shared memory device;
   a transaction translator, comprising:
      a faster handler coupled to the shared memory device to transfer data between the shared memory device and a faster port;
      a plurality of slower handlers each coupled to the shared memory device to transfer data between the shared memory device and a respective one of a plurality of slower ports, wherein the plurality of slower ports have respective lower data transfer rates than the faster port;
      wherein the faster handler and each of at least two of the slower handlers are conjunctively operable to use the shared memory device to convert from one respective data transfer rate to another respective data transfer rate; and
      wherein the faster handler and the plurality of slower handlers are configured to implement a USB (Universal Serial Bus) protocol.

2. The system of claim 1, further comprising:
a memory arbiter coupled to the shared memory device, the faster handler, and the plurality of slower handlers and configured to arbitrate between requests to access the shared memory device generated by the faster handler and the plurality of slower handlers.

3. The system of claim 1, wherein the faster handler includes at least two buffers, wherein the faster handler is configured to transfer data between the faster port and one of the at least two buffers while also transferring data between the shared memory device and a different one of the at least two buffers.

4. The system of claim 3, wherein a capacity of each of the at least two buffers is equal to an amount of data accessible in the shared memory device in response to a single request initiated by the faster handler.

5. The system of claim 2, wherein the memory arbiter is configured to allow the faster handler to access the shared memory device more frequently than any of the plurality of slower handlers access the shared memory device.

6. The system of claim 2, wherein the memory arbiter is configured to allow the faster handler to access the shared memory device at least every other arbitration cycle in the memory arbiter.

7. The system of claim 2, wherein there are N slower handlers in the plurality of slower handlers, and wherein the memory arbiter is configured to allow one of the plurality of slower handlers to access the shared memory device at least every 2N arbitration cycles in the memory arbiter.

8. The system of claim 2, wherein the memory arbiter is configured to arbitrate between the plurality of slower handlers on a round-robin basis.

9. The system of claim 2, wherein the memory arbiter is configured to map data written by the faster handler into a region of the shared memory device corresponding to one of the plurality of slower handlers to which the data is being transferred.

10. The system of claim 2, wherein the memory arbiter is configured to map data written by one of the plurality of slower handlers into a region of the shared memory device corresponding to that one of the slower handlers.

11. The system of claim 1, wherein the shared memory device is a single-ported memory device.

12. A method, comprising:
a plurality of ports in a USB (Universal Serial Bus) hub each receiving a respective data stream, wherein at least one of the plurality of ports receives its respective data stream at a different rate than other ones of the plurality of ports, wherein a respective one of a plurality of handlers is associated with each of the plurality of ports, and wherein the plurality of handlers are comprised in a transaction translator;
arbitrating between the plurality of handlers for access to a shared memory device;
one of the plurality of handlers storing to the shared memory device data included in the respective data stream received by the respective one of the plurality of ports in response to being selected by said arbitrating; and
wherein a first handler associated with a port of the at least one of the plurality of ports and each of at least two handlers associated with respective ports of the other ones of the plurality of ports are conjunctively operable to convert from one respective data transfer rate to another respective data transfer rate.

13. An apparatus, comprising:
a transaction translator, comprising:
a faster handler coupled to a faster port;
a plurality of slower handlers;
a shared memory device, external to the transaction translator, wherein the shared memory device is coupled to the faster handler and the plurality of slower handlers;
wherein the plurality of slower handlers are coupled to the shared memory device to transfer data between the shared memory device and a respective one of a plurality of slower ports, wherein the plurality of slower ports have respective lower data transfer rates than the faster port;
wherein the faster handler and each of at least two of the slower handlers are conjunctively operable to use the shared memory device to convert from the data transfer rate of the faster port to the respective lower data transfer rates of the slower ports; and
wherein the faster handler and the plurality of slower handlers are configured to implement a USB (Universal Serial Bus) protocol.

14. The apparatus of claim 13, further comprising:
a memory arbiter coupled to the shared memory device, the faster handler, and the plurality of slower handlers and configured to arbitrate between requests to access the shared memory device generated by the faster handler and the plurality of slower handlers.

15. The method of claim 12, wherein the plurality of handlers comprises a faster handler associated with a faster port of the plurality of ports, wherein the faster handler includes at least two buffers, wherein the faster handler is configured to transfer data between the faster port and one of the at least two buffers while also transferring data between the shared memory device and a different one of the at least two buffers.

16. The method of claim 15, wherein a capacity of each of the at least two buffers is equal to an amount of data accessible in the shared memory device in response to a single request initiated by the faster handler.

17. The method of claim 12, wherein the plurality of handlers comprises a faster handler associated with a faster port of the plurality of ports, wherein said arbitrating allows the faster handler to access the shared memory device more frequently than any other handlers of the plurality of handlers.

18. The method of claim 12, wherein the shared memory device is a single-ported memory device.

19. The apparatus of claim 13, wherein the faster handler includes at least two buffers, wherein the faster handler is configured to transfer data between the faster port and one of the at least two buffers while also transferring data between the shared memory device and a different one of the at least two buffers.

20. The apparatus of claim 19, wherein a capacity of each of the at least two buffers is equal to an amount of data accessible in the shared memory device in response to a single request initiated by the faster handler.

21. The apparatus of claim 14, wherein the memory arbiter is configured to allow the faster handler to access the shared memory device more frequently than any of the plurality of slower handlers access the shared memory device.

22. The apparatus of claim 13, wherein the shared memory device is a single-ported memory device.

* * * * *